Dec. 31, 1935.                L. RICEFIELD                2,025,825
COUPLING
Filed Dec. 13, 1930            3 Sheets-Sheet 1
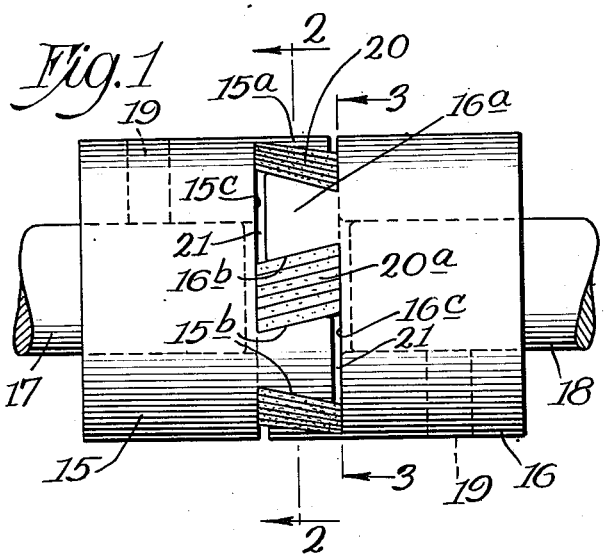
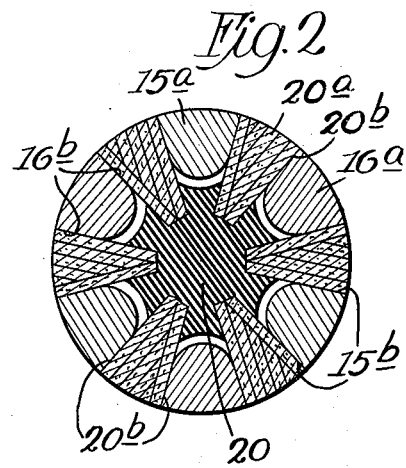
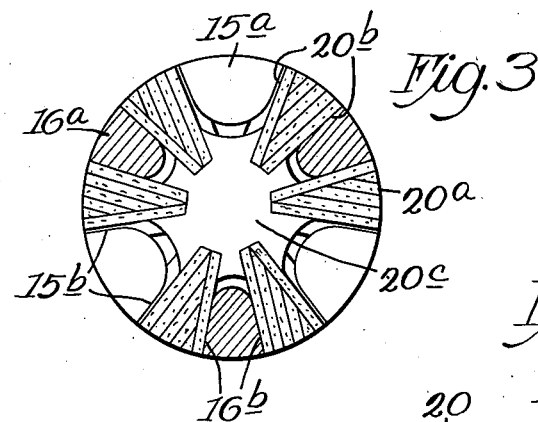
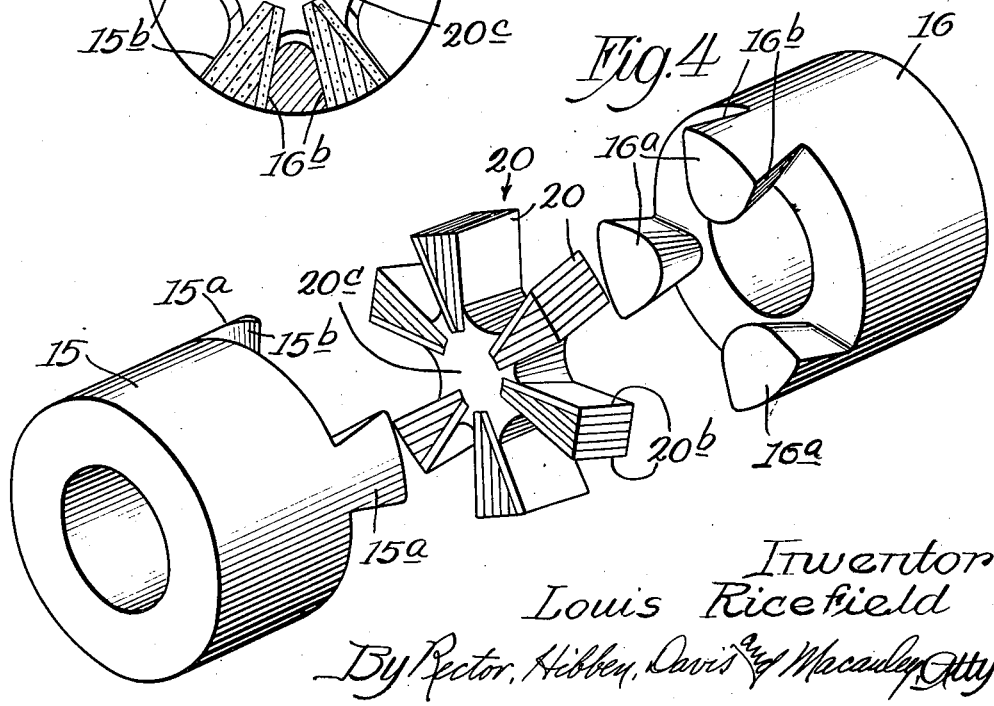
Inventor:
Louis Ricefield
By Rector, Hibben, Davis and Macauley Attys.

Dec. 31, 1935.   L. RICEFIELD   2,025,825
COUPLING
Filed Dec. 13, 1930   3 Sheets-Sheet 2

Inventor
Louis Ricefield
By Rector, Hibben, Davis & Macauley Attys.

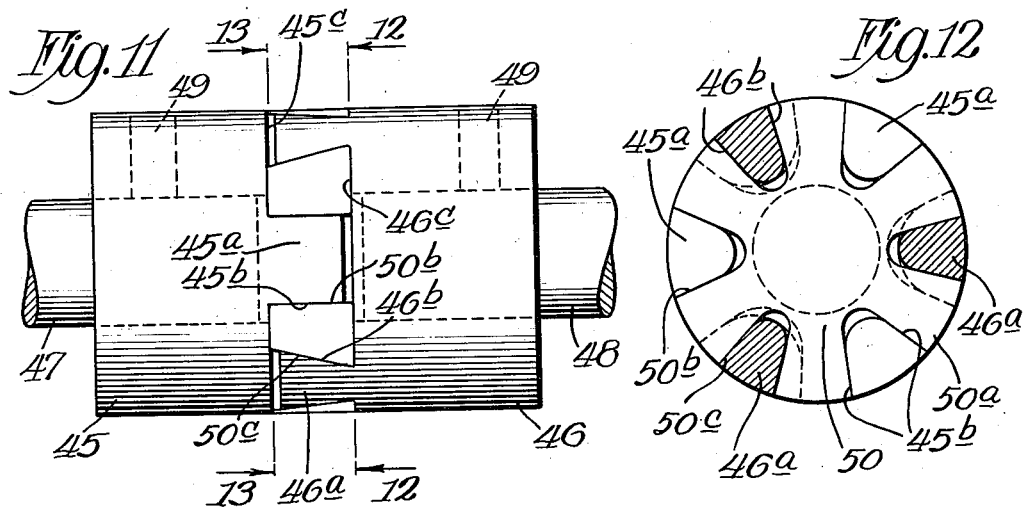
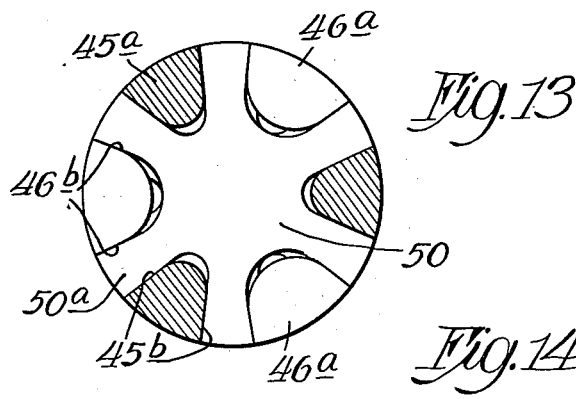
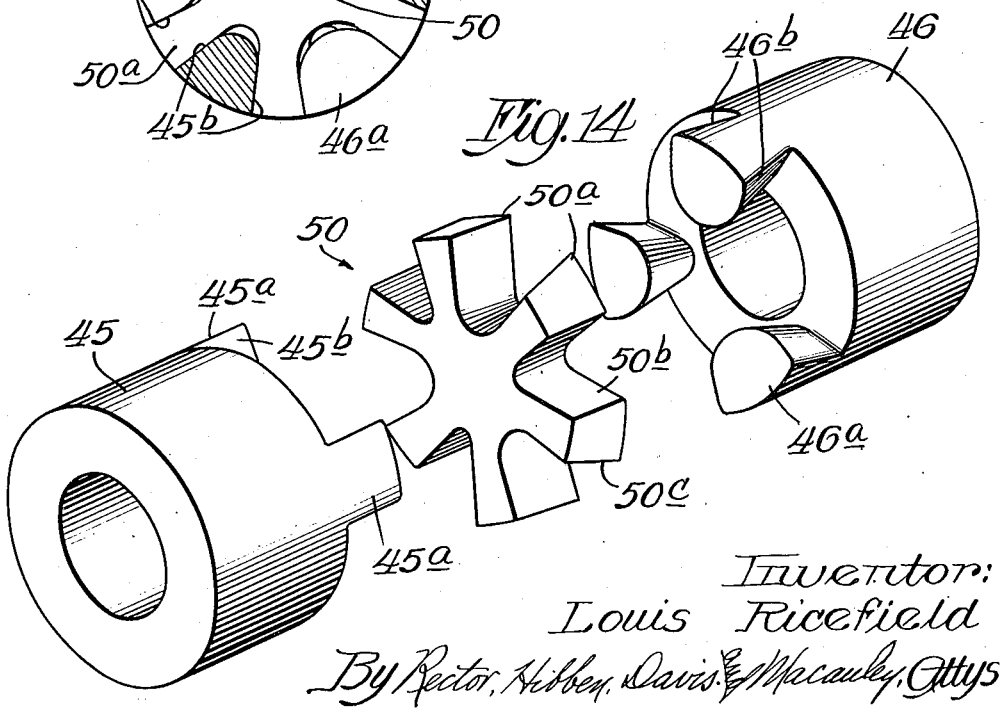

Patented Dec. 31, 1935

2,025,825

UNITED STATES PATENT OFFICE 2,025,825

COUPLING

Louis Ricefield, Oak Park, Ill.

Application December 13, 1930, Serial No. 502,199

8 Claims. (Cl. 64—14)

This invention relates to improvements in couplings and its purpose is to provide an improved device for connecting substantially aligned shafts for the purpose of compensating for angular misalignment of said shafts, for relative lateral displacement thereof, and for relative end motion of said shafts during their rotation. In my co-pending application, Serial No. 345,641 filed March 9, 1929, there is disclosed a form of coupling comprising two coupling members each of which is adapted to be secured to one of the substantially aligned shafts and each of which is provided with a plurality of longitudinally extending lugs or jaws adapted to mesh loosely with the lugs or jaws upon the other coupling member. These jaws are adapted to coact with the radiating arms of an intervening spider which is formed of resilient material, such as rubber, for example, and the arms of this spider contact with the faces of the adjacent jaws carried by opposite coupling members in such a way that the surfaces of each arm contact on opposite sides with jaw surfaces which are parallel to each other and parallel to an intermediate plane containing the axis of the shafts. With such a construction it is desirable that the arms of the spider be of sufficient size, measured longitudinally of the shafts, to engage the end surfaces of the coupling members between the jaws, so that the ends of the jaws on one member will not abut against the other coupling member between its jaws, but this construction has the disadvantage that the resilient arms of the spider are compressed transversely to the axis of the shafts when forces are transmitted from one shaft to the other and this results in the elongation of the spider arms in the direction of the axis of the shafts so that the coupling members are thereby forced apart by the longitudinal expansion of the spider arms and relative end motion of the shafts is thereby produced which is objectionable in many circumstances.

The principal object of the present invention is to overcome the above-mentioned difficulty by providing an improved form of coupling comprising a pair of coupling members provided with intermeshing jaws and an intervening resilient spider, having the coacting surfaces of the jaws and the spider arms so arranged that the coaction between the arms and the jaws sets up forces which are adapted to pull the two coupling members toward each other and thereby oppose any tendency for a relative movement in the opposite direction arising from the compression of the spider arms by the transmission of forces from one coupling member to the other. This advantageous feature is preferably accomplished by inclining the contacting surfaces of the spider arms and jaws with respect to planes containing the axis of the shaft and also, preferably, by forming the surfaces of the jaws so that the surfaces of adjacent jaws which contact with a single spider arm converge inwardly instead of being parallel with each other. With the spider arms engaging surfaces of adjacent jaws thus converging inwardly, the spider arms are also formed so that the opposite surfaces of each spider arm converge inwardly and thus each arm has a greater thickness at its outer end than at its inner portion, which is desirable because of the fact that the outer ends of the spider arms are compressed more than the inner portions upon relative angular movement of the coupling members during the transmission of forces from one member to the other, and previous practice has shown that the spider arms tend to wear off more rapidly at their outer ends than elsewhere. Other objects of the invention relate to various features of construction and arrangement which will appear more fully hereinafter.

The nature of the invention will be understood from the following specification taken with the accompanying drawings in which several embodiments are illustrated.

In the drawings:

Figure 1 shows a side elevation of an improved coupling embodying one form of the present invention;

Fig. 2 shows a transverse vertical section on the line 2—2 of Fig. 1;

Fig. 3 shows a transverse vertical section on the line 3—3 of Fig. 1;

Fig. 4 is a perspective view of the coupling shown in Fig. 1 with the several parts of the coupling separated from each other longitudinally;

Fig. 11 shows a side elevation of a third form of the invention in which the opposite surfaces of each jaw on one coupling member converge longitudinally of the shaft while the opposite surfaces of each jaw on the other coupling member extend in planes which converge radially inward but do not have any longitudinal convergence;

Fig. 12 is a detailed section taken on the line 12—12 of Fig. 11;

Fig. 13 is a detailed section taken on the line 13—13 of Fig. 11; and

Fig. 14 is a perspective view of the coupling shown in Fig. 11 with the several parts thereof spaced apart and separated from each other.

Figure 5:
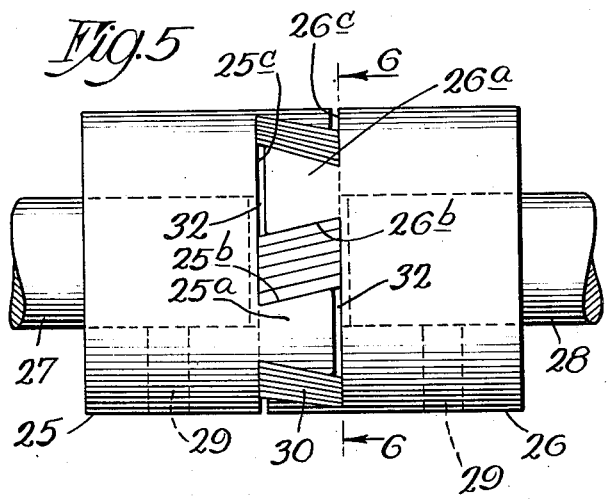
Fig. 5 shows a side elevation of a modified form of the invention in which the opposed surfaces of adjacent spider arms are parallel to each other instead of being arranged to converge inwardly, as in the first form of the invention illustrated.

Referring first to the form of the invention illustrated in Figs. 1 to 4, inclusive, it will be seen that the improved coupling comprises a pair of similar coupling members 15 and 16 each of which is adapted to be secured upon one of the substantially aligned shafts 17 and 18 by means of threaded set screws 19 which engage apertures therein and which contact with the surface of the shaft. Obviously, other means might be employed for securing the coupling members on the shafts to be connected. Each coupling member 15 is provided with a plurality of longitudinally extending jaws 15$^a$ which are adapted to intermesh loosely with a plurality of similar jaws 16$^a$ formed on the other coupling member 16. Between the two coupling members 15 and 16, there is mounted a spider 20 having a plurality of radiating arms 20$^a$ each of which is adapted to fit between and coact with two adjacent jaws 15$^a$ and 16$^a$.

Each jaw 15$^a$ is provided with two opposite spider engaging surfaces 15$^b$ which converge inwardly toward the axis of the shafts and which also converge longitudinally toward the body portion of the coupling member 15. The jaws 16$^a$ on the coupling member 16 are similarly constructed so that each jaw member 16$^a$ has two opposite spider engaging surfaces 16$^b$ which converge inwardly toward the axis of the shafts and also converge longitudinally toward the body portion of the coupling member 16. The coupling members 15 and 16 are formed of metal, such as hardened steel, or the like, and the intervening spider 20, which is formed of resilient material, such as layers of fabric impregnated with rubber and united by vulcanization to form the spider arms 20$^a$ which have their inner ends embedded in a hub or core 20$^c$ of rubber. The layers of fabric in the arms 20$^a$ are preferably arranged to extend transversely to the directions of the forces which are transmitted by the lugs with which the arms contact. The radiating arms 20$^a$ thereof are each provided with opposite surfaces 20$^b$ adapted to coact with the adjacent surfaces 15$^b$ and 16$^b$ carried by two adjacent jaws 15$^a$ and 16$^a$ of the opposite coupling members. The arrangement of these surfaces is such that the opposite contacting surfaces 20$^b$ of each spider arm converge inwardly toward the hub portion of the spider and these opposite surfaces 20$^b$ of each spider arm are also formed so that they are inclined longitudinally of the axes of the shafts, as shown in Fig. 1. The hub of the spider is preferably resilient, as well as the arms, so that some distortion of the hub may take place during the transmission of forces from one coupling member to the other, in order to assist in compensation for relative angular displacement or misalignment of the shafts without causing undue relative motion of the contacting surfaces upon each other. The arms 20$^a$ of the spider are preferably of such length, measured longitudinally of the shafts, that clearances are provided between the ends of the jaws and the end surfaces 15$^c$ and 16$^c$ of the coupling members, when the coupling members are in their innermost positions with respect to each other, as shown in Fig. 1, wherein the opposite end surfaces of the spider arms are in contact with the surfaces 15$^c$ and 16$^c$ of the coupling members. The clearance 21 which is thus provided prevents the ends of the jaws abutting against the metallic end surfaces of the coupling members between the jaws and at the same time permits such further relative movement of the coupling members toward each other as may be permitted by the compression of the spider arms.

With the construction described above, the forces which are transmitted from the jaw members to the spider arms and from the spider arms to the jaw members have components which act longitudinally of the shafts and the reactions which are set up by these components of the transmitted forces tend to move the jaw members and the coupling members by which they are carried, longitudinally of the shafts toward each other, whereas in the construction of coupling described in my co-pending application above referred to, the transmission of forces through the spider arms and the resultant compression of the spider arms is adapted to effect a movement of the coupling members away from each other. With the present invention, therefore, even though the spider arms 20$^a$ be compressed by the transmission of forces from the jaw members of one coupling member to the jaw members of the other coupling member, the forces set up between the spider arms and the jaws, on their contacting surfaces, are such that any tendency of the spider arms to force the coupling members apart, by reason of the compression of the spider arms and the elongation thereof longitudinally of the shafts, is compensated for by the components of the forces acting between the spider arms and the jaws which tend to move the coupling members toward each other. This arrangement of the contacting surfaces of the spider arms and jaws, whereby a wedging action is secured, not only prevents an abnormal relative separation of the connected shafts during operation, but also provides an initial resistance to relative end motion of the shafts so that relative end play of the connected shafts is not only compensated for but is automatically resisted by the coaction of the contacting parts of the coupling members.

Figure 6:
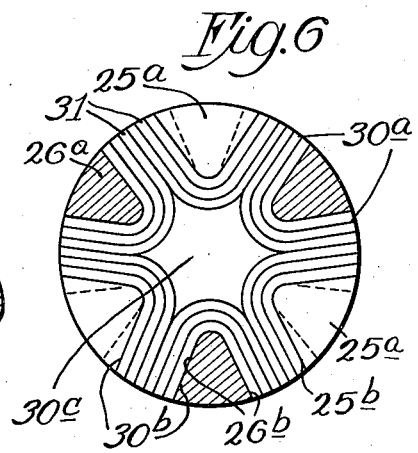
Fig. 6 shows a sectional view taken on the line 6—6 of Fig. 5.
Figure 7:
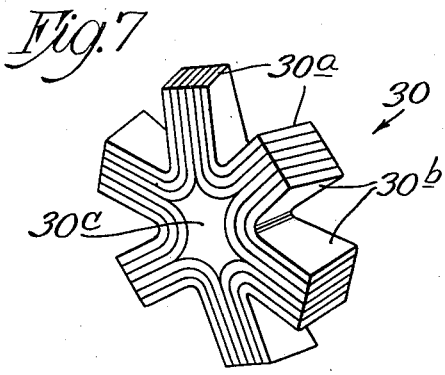
Fig. 7 shows a perspective view of the spider embodied in the coupling illustrated in Fig. 5.

In Figs. 5, 6, and 7 of the drawings, there is illustrated a modified form of the invention in which the spider engaging surfaces of adjacent jaws are parallel with each other instead of converging inwardly. In this form of the invention, two similar coupling members 25 and 26 are adapted to be secured to a pair of substantially aligned shafts 27 and 28 by means of set screws 29 or other fastening means. The coupling member 25 is provided with longitudinally extending jaws 25$^a$ spaced apart and adapted to mesh loosely with similar jaws 26$^a$ which extend longitudinally from the body portion of the other coupling member 26. Between these coupling members, there is located a spider member 30 having radiating arms 30$^a$ which are adapted to extend between the jaws 25ᵃ and 26ᵃ and to contact with the surfaces thereof.

As in the first form of the invention, the coupling members 25 and 26 are formed of metal and the intervening spider is formed of resilient material which may be rubber having layers of fabric embedded therein or layers of leather which are suitably secured together. In the present embodiment, the spider is made up of a number of layers 31 of fabric which are impregnated with rubber and which are reversely bent and secured together by vulcanization to form a number of radiating arms which are united with a central core 30ᶜ which is formed of solid rubber. The opposite surfaces 25ᵇ of each jaw 25 converge inwardly toward the axis of the shafts and also converge longitudinally toward the body portion of the coupling member 25. The jaws 26ᵃ are similarly provided with opposite surfaces 26ᵇ which are so arranged that these surfaces on each jaw converge inwardly toward the axis of the shafts and also converge longitudinally toward the body portion of the coupling 26. The surfaces 25ᵇ and 26ᵇ are so arranged that each surface 25ᵇ on one jaw is parallel to the surface 26ᵇ of the next adjacent jaw and also parallel to an intermediate plane making an angle with the axis of the shaft. The spider arms 30ᵃ have opposite surfaces 30ᵇ which are so arranged that these surfaces on each spider arm are parallel with each other and parallel to the surfaces 25ᵇ and 26ᵇ of two adjacent jaws with which they coact. The spider arms 30ᵃ are of such length measured longitudinally of the shafts that, when the two coupling members are in their innermost positions as shown in Fig. 5, with the end surfaces of the spider engaging the inner end surfaces 25ᶜ and 26ᶜ of the coupling members, the ends of the jaws are spaced from these surfaces 25ᶜ and 26ᶜ to leave intervening clearances 32. With this construction, as in the first form of construction described, the components of the forces which are transmitted to the contacting surfaces of the jaws and spider arms, acting along these surfaces, tend to move the two coupling members inwardly toward each other in opposition to the forces which are set up by the compression of the spider arms between the jaws.

Figure 9:
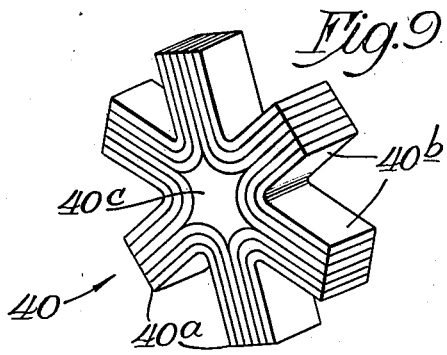
Fig. 9 is a perspective view of the spider embodied in the form of coupling shown in Fig. 8.
Figure 8:
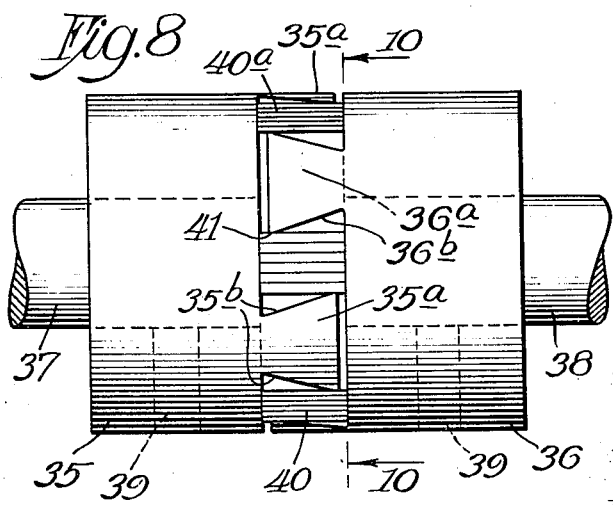
Fig. 8 shows a side elevation of a second present form of the invention in which the opposite surfaces of each jaw converge inwardly toward the body of the coupling member, although the opposite surfaces of each spider arm are parallel with each other.
Figure 10:
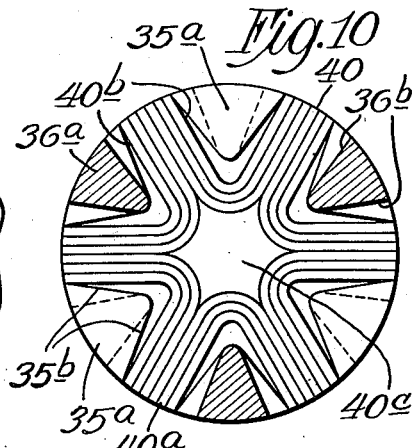
Fig. 10 is a sectional view taken on the line 10—10 of Fig. 8.

In Figs. 8, 9, and 10 of the drawings, there is illustrated a third form of the invention in which a pair of coupling members 35 and 36 are connected to substantially aligned shafts 37 and 38 by means of set screws 39 or other suitable fastening means. Between these coupling members there is located a spider 40 having radiating spider arms 40ᵃ which contact with the jaws 35ᵃ and 36ᵃ formed on the coupling members 35 and 36, respectively.

The jaws 35ᵃ have opposite spider engaging surfaces 35ᵇ which converge inwardly toward the axis of the shafts and also converge longitudinally toward the body portion of the coupling member 35. Similarly, the jaws 36ᵃ are provided with opposite spider engaging surfaces 36ᵇ which converge inwardly toward the axis of the shafts and also converge endwise toward the body portion of the coupling 36 by which they are carried. These metallic jaws of the coupling members 35 and 36 are adapted to coact with the resilient arms of the spider 40 which may be made up of layers of fabric embedded in rubber to form spider arms radiating outwardly from a core or hub 40ᵇ which is formed of solid rubber. Instead of forming the opposite jaw engaging surfaces 40ᵇ of the spider arms to extend parallel to the surfaces of the jaws in which they coact, these surfaces 40ᵇ are arranged to extend parallel to each other on each jaw and also parallel to a plane passing midway between them and containing the axis of the shafts. With this arrangement, the jaws 35ᵃ and 36ᵃ contact with the surfaces 40ᵇ of the spider arms only at the ends of the jaws as shown at 41, when the shafts 37 and 38 are at rest. However, when one shaft begins to rotate and forces are transmitted therefrom through the couplings to the other shafts, the coaction of the spider arms and the jaws with each other at the point 41 results in twisting of the spider arms about their radial axes so that they tend to conform to the surfaces 35ᵇ and 36ᵇ of the jaws and ultimately contact with the jaw surfaces throughout the areas of the spider arms. This construction has the advantage that the shock incident to the starting of the rotation of the driven shaft is taken up by the distortion of the spider arms which are made of resilient material.

In the form of the invention shown in Figs. 11, 12, 13, and 14 of the drawings, a pair of coupling members 45 and 46 are secured on the respective shafts 47 and 48 by means of set screws 49. The coupling member 45 has a plurality of longitudinally extending lugs 45ᵃ which are adapted to intermesh loosely with the lugs 46ᵃ which are formed on the other coupling member 46. The lugs 45ᵃ have opposite surfaces 45ᵇ which converge inwardly toward the axis of the shaft 47 but which lie in planes parallel to said axis so that there is no convergence of these surfaces in either direction longitudinally of the shafts. The lugs 46ᵃ on the other coupling member have opposite surfaces 46ᵇ which converge inwardly toward the axis of the shaft 48 but which also converge endwise toward the body of the coupling member. The surfaces 45ᵇ and 46ᵇ of the lugs carried by the coupling members are adapted to contact with the arms of an intervening spider 50 which may preferably be formed of layers of fabric impregnated with rubber and united with each other by vulcanization. This spider has a plurality of radiating arms 50ᵃ provided with surfaces 50ᵇ and 50ᶜ on each arm to coact with two of the surfaces 45ᵇ and 46ᵇ, respectively. The spider arms are so formed that each surface 50ᵇ extends parallel to the surface 45ᵇ with which it contacts, while the other surface 50ᶜ on the same arm is inclined longitudinally of the shaft so that it conforms to the inclination of the surface 46ᵇ of the lugs engaged thereby. With this construction, the converging surfaces on the lugs 46ᵃ of one coupling member tend to oppose relative endwise movement of that coupling member, but, since the surfaces 45ᵇ on opposite sides of the lugs of the other coupling member extend parallel to the axes of the shafts, although converging inwardly on each lug, the other coupling member is permitted to have a free endwise movement longitudinally of the shafts. This will permit a free floating movement of one of the connecting shafts while restraining the other against endwise movement. As in the forms of the invention previously described, the dimensions of the arms of the spider longitudinally of the shafts are such that when they engage the end surfaces 45ᵇ and 46ᵇ of the coupling members, the ends of the lugs 45ᵃ and 46ᵃ are spaced from the end surfaces 46ᶜ and 45ᶜ, respectively, so that the metallic coupling members 45 and 46 are prevented from abutting against each other when relative endwise movement occurs. This form of the invention is described and claimed in my copending divisional application Serial No. 22,247, filed May 18, 1935.

The hereindescribed construction of the power transmitting spider comprising a resilient core and radiating laminated arms of compressible material is claimed in my copending application Serial No. 443,349, filed April 11, 1930, and the coupling construction in which the spider arms have outwardly diverging jaw engaging faces is claimed, apart from the longitudinal convergance of the contacting faces of the jaws, in my copending application Serial No. 12,226, filed March 21, 1935.

Although several forms of the invention have been shown and described by way of illustration, it will be understood that it may be constructed in various other embodiments within the scope of the appended claims.

I claim:

1. The combination in a coupling for connecting substantially aligned shafts of a pair of coupling members each adapted to be secured to one of said shafts, said coupling members being provided with longitudinally extending jaws adapted to mesh loosely with each other and an intervening spider having radiating arms adapted to coact with the surfaces of said jaws each of said jaws having opposite surfaces which converge inwardly toward the axis of said shafts and also converge longitudinally of said shafts toward the body of the coupling member by which it is carried, said surfaces being arranged to coact with surfaces of the radiating arms of said spider.

2. The combination in a coupling for connecting substantially aligned shafts of a pair of coupling members each adapted to be secured upon one of said shafts, each of said coupling members being provided with a plurality of longitudinally extending jaws adapted to intermesh loosely with the jaws carried by the other coupling member, and a spider mounted between said coupling members and having a plurality of radiating arms each adapted to extend between and coact with two of said jaws carried by opposite coupling members, each of said jaws having opposite spider engaging surfaces which converge inwardly toward the axis of said shafts and also converge endwise toward the body of the coupling member by which it is carried.

3. The combination in a coupling for connecting substantially aligned shafts of a pair of coupling members each adapted to be secured to one of said shafts, a plurality of jaws formed in each of said coupling members to intermesh loosely with the jaws carried by the other coupling member, and a spider mounted between said coupling members and having radiating arms each adapted to contact with opposite surfaces carried by two adjacent jaws of opposite coupling members, said jaws and said spider arms having coacting surfaces which are inclined longitudinally of said shafts to set up forces tending to draw said coupling members toward each other when forces are transmitted through said spider from one coupling member to the other.

4. The combination in a coupling for connecting substantially aligned shafts of a pair of coupling members each adapted to be secured to one of said shafts, each of said coupling members being provided with a plurality of longitudinally extending jaws arranged to intermesh loosely with the jaws carried by the other coupling member, and an intervening spider having radiating arms adapted to extend between and coact with the jaws carried by opposite coupling members, said spider arms being formed of resilient material, said jaws being each provided with opposite spider arm engaging surfaces which converge endwise toward the body of the coupling member by which the jaw is carried so that when the spider arms are compressed by the transmission of forces from one coupling member to the other through said jaws, forces are set up which act along the inclined surfaces of said jaws to draw said coupling members toward each other.

5. The combination in a coupling of a pair of coupling members each adapted to be secured to one of a pair of substantially aligned shafts, a plurality of jaws extending longitudinally of said shafts from each of said coupling members to intermesh loosely with the jaws carried by the other coupling member, and a resilient spider mounted between said coupling members and having radiating arms adapted to extend between and contact with the jaws carried by opposite coupling members for transmitting forces from one coupling member to the other, the spider engaging surfaces of each jaw being inclined endwise toward the body of the coupling member by which the jaw is carried, the surfaces of the jaws of opposite coupling members which engage each spider arm being arranged to converge inwardly toward the axis of said shafts.

6. The combination in a coupling of a pair of coupling members each adapted to be secured to one of a pair of substantially aligned shafts, each of said coupling members comprising a plurality of longitudinally extending jaws adapted to intermesh loosely with the jaws carried by the other coupling member, each of said jaws having opposite spider engaging surfaces which converge endwise toward the body of the coupling to which the jaws is attached, and a resilient spider interposed between said coupling members and having radiating arms each extending between two jaws carried by opposite coupling members, each of said spider arms having opposite jaw-engaging surfaces which are parallel to each other and parallel to a plane midway between them containing the axis of said shaft.

7. The combination in a coupling of a pair of coupling members each adapted to be secured to one of a pair of substantially aligned shafts, each of said coupling members comprising a plurality of longitudinally extending jaws adapted to intermesh loosely with the jaws carried by the other coupling member, and a spider interposed between said coupling members and having radiating arms each adapted to extend between two of said jaws carried by opposite coupling members, said jaws and said spider arms having coacting wedging surfaces adapted to effect relative endwise movement of said coupling members toward each other when forces are transmitted from one coupling member to the other.

8. The combination in a coupling for connecting substantially aligned shafts, of a plurality of coupling members including two members each of which is adapted to be secured upon one of said shafts, said coupling members having intermeshing parts through which forces are transmitted from one shaft to the other, said intermeshing parts having coacting working surfaces adapted to effect relative endwise movement of said shafts toward each other during their rotation.

LOUIS RICEFIELD.